United States Patent
Xu et al.

(10) Patent No.: US 9,093,940 B2
(45) Date of Patent: Jul. 28, 2015

(54) METHODS OF DETERMINING INITIAL POSITION OF A ROTOR AND SYSTEMS THEREOF

(71) Applicants: Wei Xu, Madison, WI (US); Robert Shaw, Moorhead, MN (US); Jiyao Wang, Madison, WI (US)

(72) Inventors: Wei Xu, Madison, WI (US); Robert Shaw, Moorhead, MN (US); Jiyao Wang, Madison, WI (US)

(73) Assignee: DEERE & COMPANY, Moline, IL (US)

( * ) Notice: Subject to any disclaimer, the term of this patent is extended or adjusted under 35 U.S.C. 154(b) by 198 days.

(21) Appl. No.: 13/804,802

(22) Filed: Mar. 14, 2013

(65) Prior Publication Data
US 2014/0225548 A1 Aug. 14, 2014

Related U.S. Application Data

(60) Provisional application No. 61/764,567, filed on Feb. 14, 2013.

(51) Int. Cl.
*H02P 1/04* (2006.01)
*H02P 6/18* (2006.01)
*H02P 21/00* (2006.01)

(52) U.S. Cl.
CPC ............ *H02P 6/183* (2013.01); *H02P 21/0053* (2013.01)

(58) Field of Classification Search
CPC .......... H02P 6/185; H02P 1/50; H02P 25/102
USPC ............ 318/400.33, 715, 725, 721, 809, 811, 318/803, 805
See application file for complete search history.

(56) References Cited

U.S. PATENT DOCUMENTS

| | | | |
|---|---|---|---|
| 5,296,794 A * | 3/1994 | Lang et al. | 318/715 |
| 2006/0175064 A1 | 8/2006 | Yuratich | |
| 2007/0069682 A1 | 3/2007 | Ide et al. | |
| 2010/0026223 A1 | 2/2010 | Liu et al. | |
| 2011/0050140 A1 | 3/2011 | Sakai et al. | |
| 2013/0006455 A1* | 1/2013 | Li | 701/22 |

OTHER PUBLICATIONS

International Search Report dated May 23, 2014.
Turin, G. L., "An Introduction to Matched Filters," IRE Transactions on Information Theory, pp. 311-329, 1960.
Kim, H. et al., "A Novel Method for Initial Rotor Position Estimation for IPM Synchronous Machine Drives," IEEE Transactions on Industry Applications, vol. 40, No. 5, Sep./Oct. 2004.
Khalil, H.K., "Nonlinear Systems," 3rd Edition, pp. 254-261, 2002.

* cited by examiner

*Primary Examiner* — Karen Masih
(74) *Attorney, Agent, or Firm* — Harness, Dickey & Pierce, P.L.C.

(57) ABSTRACT

At least one example embodiment discloses a drive system including a motor including a rotor, the motor configured to receive a measured current, a controller configured to generate a voltage for the motor at a stationary reference frame, the voltage having a frequency and the measured current being based on the voltage, a filter configured to obtain position information of the rotor based on the measured current and a nonlinear observer configured to estimate a rotor position of the motor during the stationary reference frame based on the position information. The controller is configured to control the motor based at least in part on the estimated rotor position.

22 Claims, 6 Drawing Sheets

METHODS OF DETERMINING INITIAL POSITION OF A ROTOR AND SYSTEMS THEREOF

PRIORITY

This non-provisional application claims priority under 35 U.S.C. §119 to provisional application No. 61/764,567 filed Feb. 14, 2013; the entire contents of which are hereby incorporated by reference.

FIELD

Example embodiments are related to electric drive device systems and/or methods for controlling electric drive devices such as Interior Permanent Magnet (IPM) motors or machines.

BACKGROUND

IPM synchronous motors (IPMSMs) are used in hybrid and electric vehicle systems. Rotor position of the IPMSM is used for high-performance traction or voltage control of the IPMSM.

Electromechanical type of position sensors, e.g., resolvers, optical encoders, and hall-effect sensors, are used to obtain the rotor position and/or speed in IPMSM drive systems. The use of these electromechanical sensors increases cost, size, weight, and hardware wiring complexity of the IPMSM drive systems. Moreover, mounting electromechanical sensors on a rotor of the motor affects the robustness of the IPMSM. Sensors are often subject to failures in harsh environments, such as excessive ambient temperature, super high-speed operation, and other adverse or heavy load conditions.

As an alternative to sensors, sensorless drives including observers are used. One type of an art recognized observer is a sliding mode observer (SMO). A SMO is embodied in a specific purpose computer, mainly a microcontroller or digital signal processor specifically programmed to execute the SMO. In general, a SMO is an observer having inputs that are discontinuous functions of an error between estimated and measured outputs. In a SMO, a manifold is designed such that a system state trajectory exhibits a certain behavior when confined to the manifold. The manifold may also be referred to as a sliding surface.

SUMMARY

The inventors have discovered that extended back electromagnetic force (EMF) tracking is not appropriate since there is no back EMF when the motor is kept standstill. Moreover, conventional voltage injection techniques assume that a constant DC bus voltage is guaranteed.

At least one example embodiment discloses a drive system including a motor including a rotor, the motor configured to receive a measured current, a controller configured to generate a voltage for the motor at a stationary reference frame, the voltage having a frequency and the measured current being based on the voltage, a filter configured to obtain position information of the rotor based on the measured current and a nonlinear observer configured to estimate a rotor position of the motor during the stationary reference frame based on the position information. The controller is configured to control the motor based at least in part on the estimated rotor position.

BRIEF DESCRIPTION OF THE DRAWINGS

Example embodiments will be more clearly understood from the following detailed description taken in conjunction with the accompanying drawings. FIGS. 1A-4 represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

Generally, high frequency injection (HFI)-based self-sensing methods for initial position detection are used when a machine terminal is connected to a high voltage DC source. However, in at least one example embodiment, the high voltage DC source is disconnected during the initial position detection process. Instead, the energy stored in the DC bus capacitor is used.

At least one example embodiment discloses a system configured to detect an IPMSM initial position without a high power supply. High power supply may refer to a battery which supplies continuous power over a DC bus such as 500V. In an example embodiment, a DC bus capacitor builds up a DC voltage from a low power supply such as a 48V portable battery. The low power supply may be provided for a controller. The energy used for detection by the controller is the DC voltage built by the DC bus capacitor. Once a high frequency voltage is injected the DC voltage built up by the DC bus capacitor dissipates.

In at least one example embodiment, the DC bus capacitor is precharged to a voltage level to saturate the stator iron as an energy source.

At least one example embodiment discloses a drive system including a motor including a rotor, the motor configured to receive a measured current, a controller configured to generate a voltage for the motor at a stationary reference frame, the measured current being based on the voltage, a filter configured to obtain position information of the rotor based on the measured current and a nonlinear observer configured to estimate a rotor position of the motor during the stationary reference frame based on the position information. The controller is configured to control the motor based at least in part on the estimated rotor position.

In an example embodiment, the nonlinear observer is configured to sample the measured current at a frequency of less than 10 kHz.

In an example embodiment, the nonlinear observer is configured to sample the position information at approximately 5 kHz.

In an example embodiment, the controller is configured to generate the voltage to have a frequency of 500 Hz.

In an example embodiment, the generated voltage dissipates a voltage across a direct current (DC) bus capacitor.

In an example embodiment, the nonlinear observer is configured to estimate the rotor position during one discharging cycle of the DC bus capacitor.

In an example embodiment, the system further includes an inverter configured to supply a three-phase current to the motor based on pulse width modulation (PWM).

In an example embodiment, the nonlinear observer is configured to estimate the rotor position at a sampling frequency relatively greater than a PWM frequency.

In an example embodiment, the filter includes a matched filter configured to filter noise from the measured current and a synchronous reference frame filter configured to extract the position information of the rotor from the filtered measured current.

In an example embodiment, the matched filter is configured to maintain a fundamental energy of a waveform of the measured current.

In an example embodiment, the matched filter is configured to maintain a sinusoidal shape of a waveform of the measured current.

At least one example embodiment discloses a method of estimating a rotor position in a motor. The method includes generating a voltage for the motor at a stationary reference frame, obtaining a measured current for the motor, the measured current being based on the generated voltage, filtering the measured current to obtain position information of the rotor and determining an estimate of the rotor position during the stationary reference frame based on the position information.

In an example embodiment, the determining an estimate includes sampling the position information at a frequency of less than 10 kHz.

In an example embodiment, the determining an estimate includes sampling the position information at approximately 5 kHz.

In an example embodiment, the generating a voltage generates the voltage to have a frequency of 500 Hz.

In an example embodiment, the generated voltage dissipates a voltage across a direct current (DC) bus capacitor.

In an example embodiment, the determining an estimate of the rotor position estimates the rotor position during one discharging cycle of the DC bus capacitor.

In an example embodiment, the filtering includes filtering noise from the measured current and extracting, by a synchronous reference frame filter, the position information of the rotor from the filtered measured current.

In an example embodiment, the filtering noise maintains a fundamental energy of a waveform of the measured current.

In an example embodiment, the filtering noise maintains a sinusoidal shape of a waveform of the measured current.

At least one example embodiment discloses a method of determining a polarity in a magnet of a permanent magnet synchronous machine (PMSM). The method includes generating alternating positive and negative DC voltages for a first period of time for the PMSM, determining first and second current responses of the PMSM based on the generated positive and negative DC voltages, respectively and determining the polarity of the magnet based on the first and second current responses.

In an example embodiment, the polarity is based on a highest current response of the first and second current responses.

FIGS. 1A-2C illustrate a drive system including a motor including a rotor, the motor configured to receive a measured current, a controller configured to generate a voltage for the motor at a stationary reference frame, the measured current being based on the voltage, a filter configured to obtain position information of the rotor based on the measured current and a nonlinear observer configured to estimate a rotor position of the motor during the stationary reference frame based on the position information. The controller is configured to control the motor based at least in part on the estimated rotor position.

Figure 1A:
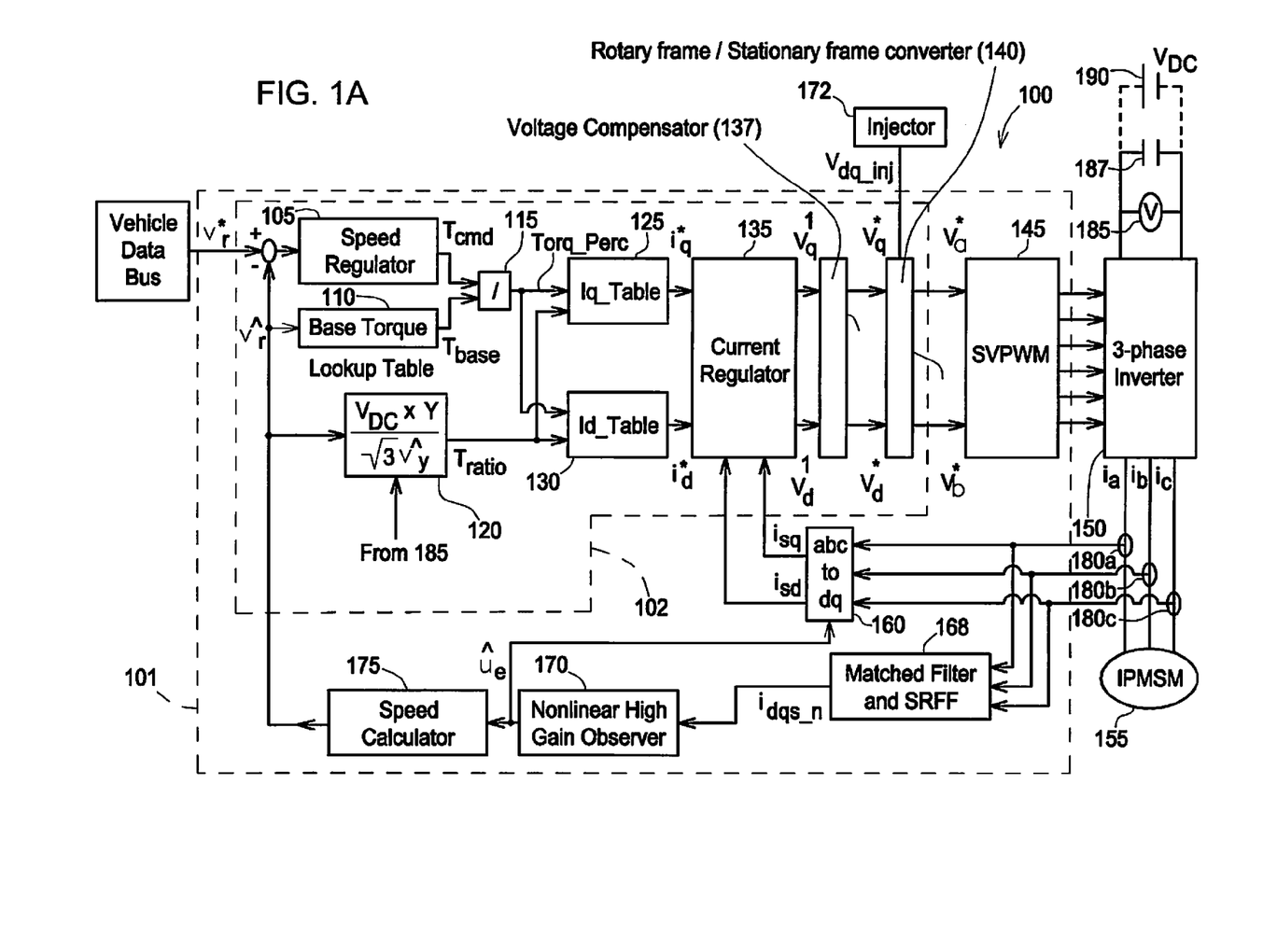
FIG. 1A illustrates a drive system for controlling an IPM machine according to an example embodiment.

In accordance with an example embodiment, FIG. 1A illustrates a drive system 100 for controlling an IPM machine such as a motor 155 (e.g., an interior permanent magnet synchronous motor (IPMSM)) or another alternating current machine. The drive system 100 may also be referred to as an IPMSM drive system.

It should be understood that the drive system 100 may include additional features that are not illustrated in FIG. 1A. For example, the drive system 100 may include a rotor magnet temperature estimation module, a current shaping module, and a terminal voltage feedback module. The features shown in FIG. 1A are illustrated for the convenience of describing the drive system 100 and it should be understood that the drive system 100 should not be limited to the features shown in FIG. 1A.

The system 100 includes electronic modules, software modules, or both. In an example embodiment, the drive system 100 includes an electronic data processing system 101 to support storing, processing or execution of software instructions of one or more software modules. The electronic data processing system 101 is indicated by the dashed lines in FIG. 1A and is shown in greater detail in FIG. 1B.

The data processing system 101 is coupled to an inverter circuit 150. The inverter circuit 150 may be a three-phase inverter. The inverter circuit 150 includes a semiconductor drive circuit that drives or controls switching semiconductors (e.g., insulated gate bipolar transistors (IGBT) or other power transistors) to output control signals for the motor 155. In turn, the inverter circuit 150 is coupled to the motor 155. The motor 155 is associated with sensors 180a, 180b and 180c.

Throughout the specification, the sensors 180a, 180b and 180c are referred to as current transducers. However, it should be understood that the sensors 180a, 180b and 180c may be another type of current sensor.

The current transducers 180a, 180b and 180c and the motor 155 are coupled to the data processing system 101 to provide feedback data (e.g., current feedback data, such as phase current values ia, ib and ic), raw position signals, among other possible feedback data or signals, for example. While only three current transducers 180a, 180b and 180c are shown, it should be understood that the driver system 100 may implement two current transducers.

The data processing system 101 includes a software controller 102, a converter 160, a pulse width generation module 145, a matched filter and synchronous reference frame filter (SRFF) 168 and a nonlinear high gain observer 170 and a speed calculator 175. The system 100 also includes a high voltage generator/injector 172.

The high voltage generator/injector 172 injects a high frequency voltage vector $v_{dq\_inj}$ rotating at a carrier frequency $w_C$ (e.g., 500 Hz) into a stationary reference frame of the IPMSM. As should be understood, reference frame refers to a coordinate system used to represent and measure properties such as position (e.g., angular rotational position), velocity, torque, electrical parameters, and orientation of the rotor of the motor, the stator of the motor, or both. In a stationary reference frame, the position (e.g., angular rotational position), rotational velocity, torque, electrical parameters and orientation of the rotor, the stator, or both are observed from a stationary observer's point of view. A stationary reference frame may refer to the case where the reference frame is aligned with the stator of the motor, or where the d-axis and the q-axis do not rotate with the rotor. For the rotor or stator, a stationary reference frame is mutually exclusive to a rotating reference frame.

In a rotating reference frame, the instantaneous stator currents of a multi-phase motor can be expressed as a single complex stator current vector in a Cartesian coordinate system. If a Park transform or a similar transform is applied to the complex stator current vector, the reference frame has direct axis (d-axis) and quadrature axis (q-axis) components that rotate with rotor flux position (e.g., local maximum in magnetic field). For a motor with permanent magnets attached to the rotor the rotor flux position does not change with respect to the rotor, as opposed to where electromagnets are used in certain rotors.

The high voltage generator/injector 172 injects a high frequency once a DC bus capacitor 187 is charged by a low power supply 190 (e.g., 48V). The low power supply 190 is interchangeable with a high power supply and may be disconnected from the system 100. The injected voltage comes from the voltage across the DC bus capacitor 187, but regulated by the inverter circuit 150 before it is injected into the motor 155.

Figure 1B:
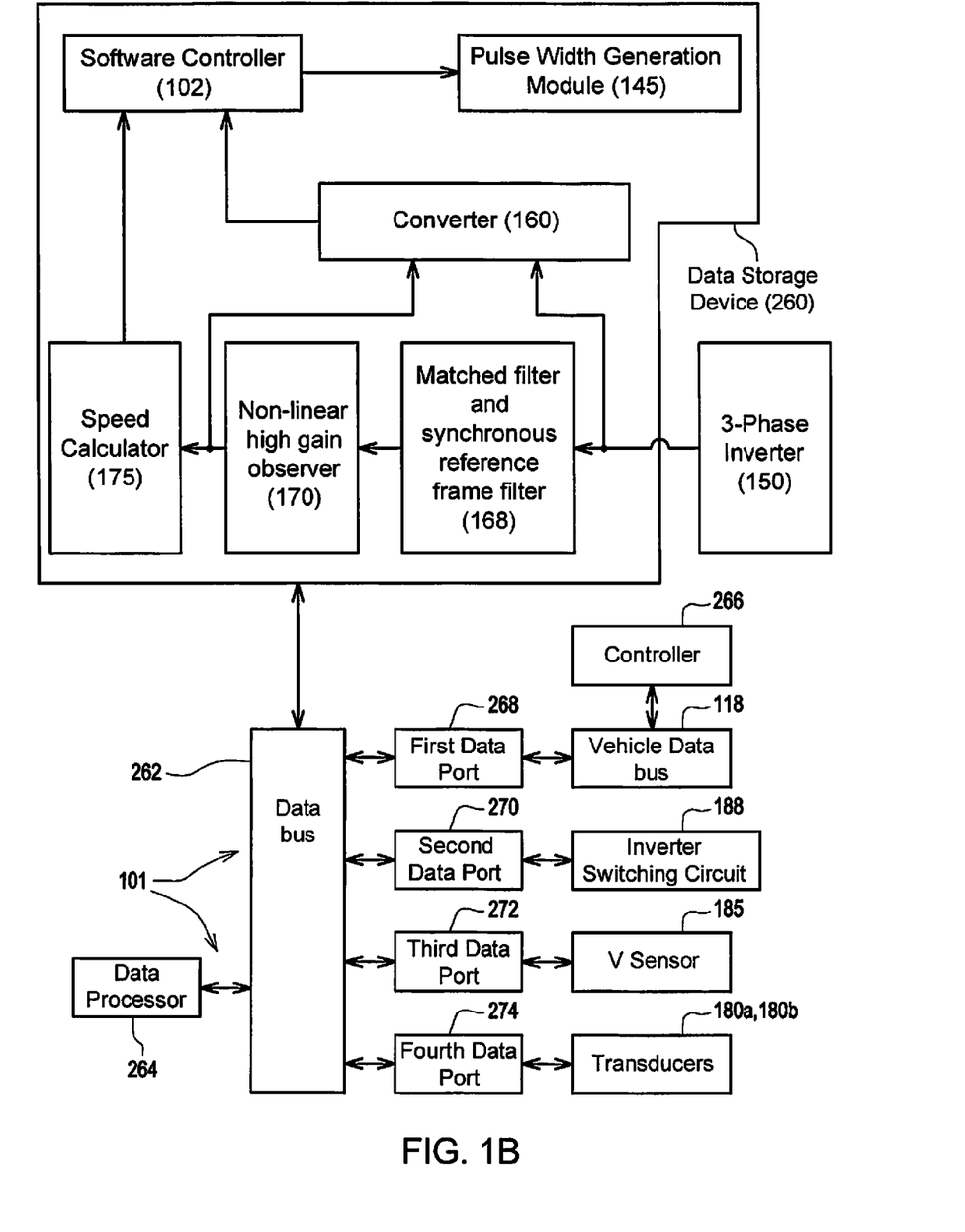
FIG. 1B illustrates a data processing system of the drive system of FIG. 1A according to an example embodiment.
Figure 1C:
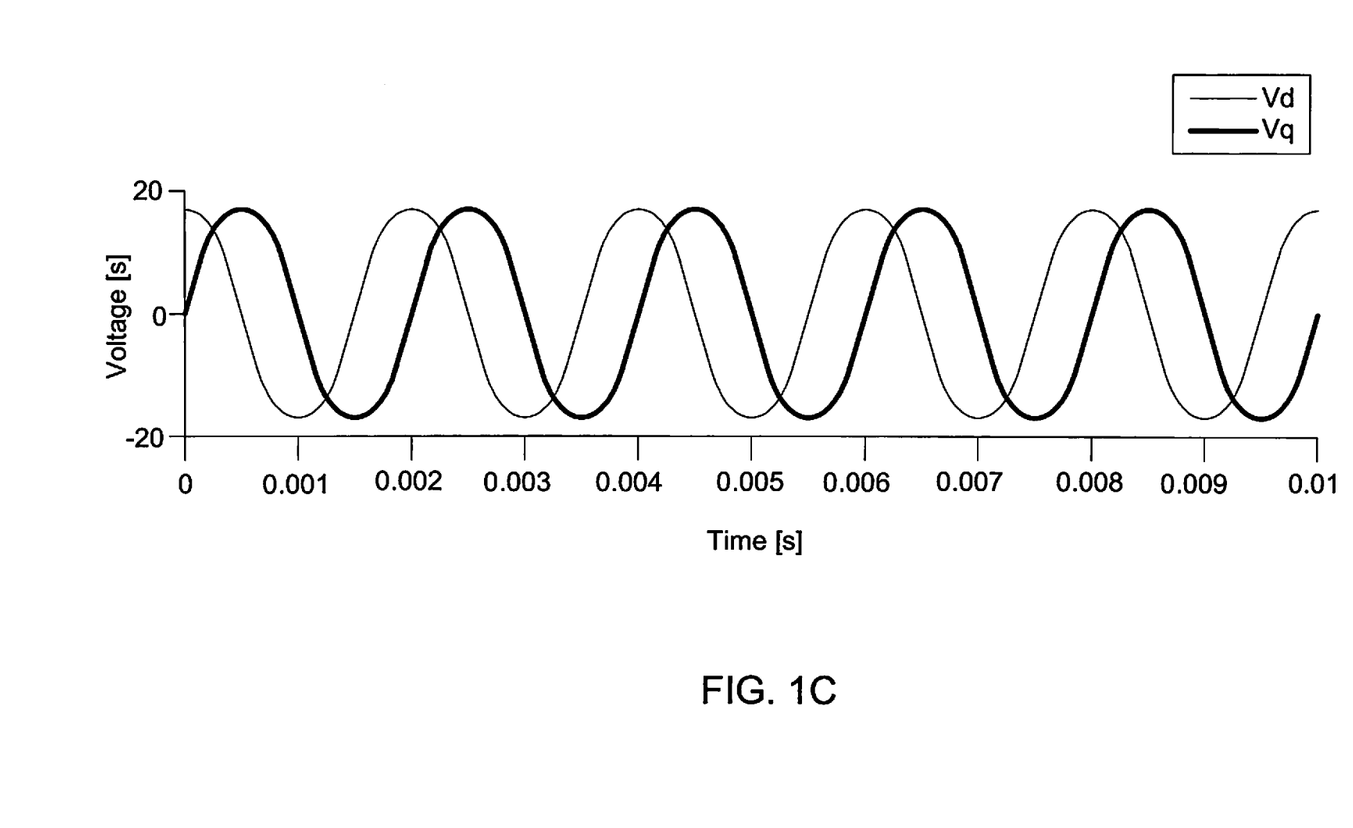
FIG. 1C illustrates an injected voltage generated by a voltage injector according to an example embodiment.

The injected high frequency voltages are sinusoidal, refer to the stationary d-q reference frame, and they have 500 Hz frequency, as shown FIG. 1C.

The software controller 102, converter 160, the pulse width generation module 145, the matched filter and synchronous reference frame filter (SRFF) 168, the nonlinear high gain observer 170 and the speed calculator 175 are software modules. While the software controller 102, converter 160, the pulse width generation module 145, the matched filter and synchronous reference frame filter (SRFF) 168, the nonlinear high gain observer 170 and the speed calculator 175 are described as executing functions, it should be understood that a data processor, such as a digital signal processor or a microcontroller, is specifically programmed to execute software controller 102, converter 160, the pulse width generation module 145, the matched filter and synchronous reference frame filter (SRFF) 168, the nonlinear high gain observer 170 and the speed calculator 175. For example, a data processor 264 is specifically programmed to execute the software controller 102, converter 160, the pulse width generation module 145, the matched filter and synchronous reference frame filter (SRFF) 168, the nonlinear high gain observer 170 and the speed calculator 175, as will be described in FIG. 1B.

The controller 102 includes a speed regulator 105, a base torque lookup table (LUT) 110, a torque processor 115, a ratio calculator 120, a q-axis current (iq) command LUT 125, a d-axis current (id) command LUT 130, a current regulator 135, a voltage compensator 137 and the rotary frame/stationary frame converter 140.

In an example embodiment, a speed regulator 105 receives input data representing a difference between an estimated rotor speed $\hat{\omega}_r$ and a command rotor speed $\omega^*_r$ as input.

The command rotor speed $\omega^*_r$ may be input by a controller (shown as 266 in FIG. 1B) via a vehicle data bus 118. For example, if an operator wants the motor 155 to run at 5,000 RPM, the operator inputs 5,000 RPM into the controller and the vehicle data bus 118 inputs the command rotor speed $\omega^*_r$ to the controller 102. The speed regulator 105 converts the received input data into a torque command $T_{cmd}$.

While the term command is used throughout the specification, it should be understood that command refers to a target value.

The base torque LUT 110 determines a base torque value $T_{base}$ based on the estimated rotor speed $\hat{\omega}_r$.

From the estimated rotor speed $\hat{\omega}_r$, base torque values are respectively associated with discrete speed points with a nominal DC bus voltage level. In other words, the two-dimensional base torque LUT 110 is established from a motor characterization procedure. During the IPM motor characterization procedure, each rotor shaft speed has a maximum output torque, which is defined as the base torque at that speed. Thus, the base torque may also be referred to as peak torque.

The base torque LUT 110 outputs the associated base torque value as the base torque value $T_{base}$ to the torque processor 115.

The torque processor 115 receives the base torque value $T_{base}$ and the torque command $T_{cmd}$. The torque command $T_{cmd}$ may be in Nm.

The torque processor 115 is configured to determine an absolute value of the torque command $T_{cmd}$. The torque processor 115 is configured to convert the absolute value of the torque command $T_{cmd}$ into a percentage Torq_Perc of the base torque value $T_{base}$. The torque processor 115 outputs the percentage Torq_Perc to the q-axis current (iq) command LUT 125 and the d-axis current (id) command LUT 130.

In addition to sending the estimated rotor speed $\hat{\omega}_r$ to the base torque LUT 110, the speed calculator 175 sends the estimated rotor speed $\hat{\omega}_r$ to the ratio calculator 120.

In addition to receiving the estimated rotor speed $\hat{\omega}_r$, the ratio calculator 120 is configured to receive the measured operating DC bus voltage value. The measured operating DC bus voltage value is provided by a voltage sensor 185 which measures the DC bus in the inverter circuit 150. The inverter circuit 150 is powered by a direct current (dc) voltage bus. The ratio calculator 120 adjusts the operating DC bus voltage $V_{DC}$ by the voltage sensor 185 to the detected operating rotor shaft speed ratio as follows:

$$T_{ratio} = \frac{V_{DC} \times Y}{\sqrt{3}\,\hat{\omega}_r} \quad (1)$$

where $T_{ratio}$ is the adjusted detected operating DC bus voltage to the detected operating rotor shaft speed ratio and Y is a coefficient. For example, the coefficient Y may be 0.9. The ratio $T_{ratio}$ is output by the ratio calculator 120 to the d-q axis current command LUTs 125 and 130. The DC bus capacitor voltage may also refer to the DC bus voltage $V_{DC}$. Consequently, DC bus capacitor voltage may be used interchangeably with DC bus voltage $V_{DC}$.

The q-axis current command (iq) LUT 125 and the d-axis current command (id) LUT 130 are configured to receive the ratio $T_{ratio}$. The q-axis current command LUT 125 and the d-axis current command LUT 130 store q-axis and d-axis current commands, respectively, each of which is associated with a pair of ratio and torque percentage values. The development of the q-axis current command LUT 125 and the d-axis current command LUT 130 may be done using any known method.

The d-q axis current refers to the direct axis current and the quadrature axis current as applicable in the context of vector-controlled alternating current machines, such as the motor 155.

The d-axis current command LUT 130 is configured to output a d-axis current command $i^*_d$ that is associated with the received torque percentage Torq_Perc and the ratio $T_{ratio}$. As shown in FIG. 1A, the d-axis current command $i^*_d$ is output to the current regulator 135.

The q-axis current command LUT 125 is configured to output a q-axis current command $i^*_q$ that is associated with the received torque percentage Torq_Perc and ratio $T_{ratio}$.

It should be understood that $i^*_d$ and $i^*_q$ are current commands for a stator of the motor 155.

While the q-axis current command LUT 125 and d-axis current command LUT 130 are illustrated and described as LUTs, it should be understood that the q-axis current command LUT 125 and d-axis current command LUT 130 may be implemented as a set of equations that relate respective torque commands to corresponding direct and quadrature axes currents, or a set of rules (e.g., if-then rules) that relates respective torque commands to corresponding direct and quadrature axes currents.

As shown in FIG. 1A, the q-axis current command $i^*_q$ is output to the current regulator 135.

The current regulator 135 is capable of communicating with the pulse-width modulation (PWM) generation module 145 (e.g., space vector PWM generation module). The current regulator 135 receives respective d-q axis current commands (e.g., $i^*_d$ and $i^*_q$) and measured d-q axis currents (e.g., $i_{sq}$ and $i_{sd}$) for the stator and outputs corresponding pre-compensated d-q axis voltage commands $v'_d$ and $v'_q$ to a voltage compensator 137.

The voltage compensator 137 provides voltage adjustment data to adjust the pre-compensated d-q axis voltage commands $v'_d$ and $v'_q$ and outputs d-q axis voltage commands $v^*_d$ and $v^*_q$. It should be understood that the voltage compensator 137 may generate the d-q axis voltage commands (e.g., $v^*_d$ and $v^*_g$ commands) using any known method such as current feed forward compensation.

The converter 140 receives the d-q axis voltage commands $v^*_d$ and $v^*_q$ and performs an inverse Park transformation to generate α-β axis voltage commands $v^*_α$ and $v^*_β$. While at least one example embodiment is described using the α-β axis, it should be understood that example embodiments may be implemented using the d-q axis or three phase representation of a control vector. As is known, d-q refers to a rotary frame and α-β refers to a stationary frame.

In an example embodiment, the PWM generation module 145 converts the d axis voltage and q axis voltage data (voltage commands $v^*_q$ and $v^*_d$) from two phase data representations into three phase representations (e.g., three phase voltage representations, such as va*, vb* and vc*) for control of the motor 155, for example. Outputs of the PWM generation module 145 are coupled to the inverter circuit 150.

The inverter circuit 150 includes power electronics, such as switching semiconductors to generate, modify and control pulse-width modulated signals or other alternating current signals (e.g., pulse, square wave, sinusoidal, or other waveforms) applied to the motor 155. The PWM generation module 145 provides inputs to a driver stage within the inverter circuit 150. An output stage of the inverter circuit 150 provides a pulse-width modulated voltage waveform or other voltage signal for control of the motor 155. In an example embodiment, the inverter 150 is powered by the direct current (dc) voltage bus voltage $V_{DC}$.

The current transducers 180a, 180b and 180c measure three phase current data ia, ib and ic, respectively, applied to the motor 155. Three-phase current data ia, ib and ic are sampled values. The three phase current data ia, ib and ic may be sampled at a frequency equal to or lower than 10 kHz such as 5 kHz.

The converter 160 may apply a Clarke transformation or other conversion equations (e.g., certain conversion equations that are suitable and are known to those of ordinary skill in the art) to convert the measured three-phase representations of current into two-phase representations of current $i_{sq}$ and $i_{sd}$ based on the current data ia, ib and ic from the current transducers 180a, 180b and 180c and an estimated rotor position $\hat{\theta}_e$ from the nonlinear high gain observer 170.

The converter 160 outputs measured d-q axis currents (e.g., $i_{sq}$ and $i_{sd}$). The output of the converter 160 is coupled to the current regulator 135.

The matched filter and SRFF 168 receives the measured three-phase representations of current ia, ib and ic from the current transducers 180a, 180b and 180c. Based on the measured three-phase representations of current ia, ib and ic, the matched filter and SRFF 168 is configured to output a negative sequence signal $i_{dqs\_n}$ of measured two-phase representations of current $i_{dqs\_f}+i_{dqs\_c}$. The negative sequence signal $i_{dqs\_n}$ represents position information of the rotor.

The nonlinear high gain observer 170 receives the negative sequence signal $i_{dqs\_n}$ and outputs the estimated rotor position $\hat{\theta}_e$ to the speed calculator 175 and the converter 160, as will be described in greater detail below.

The speed calculator 175 may convert the estimated rotor position $\hat{\theta}_e$ provided by the nonlinear high gain observer 170 into the estimated rotor speed $\hat{\omega}_r$.

In FIG. 1B, the electronic data processing system 101 includes an electronic data processor 264, a data bus 262, a data storage device 260, and one or more data ports (268, 270, 272 and 274). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a digital signal processor, microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

Moreover, in one example embodiment the data storage device 260 may store the software controller 102, converter 160, the pulse width generation module 145, the matched filter and synchronous reference frame filter (SRFF) 168, the nonlinear high gain observer 170 and the speed calculator 175 executed by the data processor 264. The data processor 264 may access the data storage device 260 and execute the software controller 102, converter 160, the pulse width generation module 145, the matched filter and synchronous reference frame filter (SRFF) 168, the nonlinear high gain observer 170 and the speed calculator 175.

As shown in FIG. 1B, the data ports include a first data port 268, a second data port 270, a third data port 272 and a fourth data port 274, although any suitable number of data ports may be used. Each data port may include a transceiver and buffer memory, for example. In an example embodiment, each data port may include any serial or parallel input/output port.

In an example embodiment as illustrated in FIG. 1B, the first data port 268 is coupled to the vehicle data bus 118. In turn, the vehicle data bus 118 is coupled to a controller 266. In one configuration, the second data port 270 may be coupled to the inverter circuit 150; the third data port 272 may be coupled to the voltage sensor 185; and the fourth data port 274 may be coupled to the transducers 180a and 180b.

In an example embodiment of the data processing system 101, the speed regulator 105 is associated with or supported by the first data port 268 of the electronic data processing system 101. The first data port 268 may be coupled to a vehicle data bus 118, such as a controller area network (CAN) data bus. The vehicle data bus 118 may provide data bus messages with torque commands to the speed regulator 105 via the first data port 268. The operator of a vehicle may generate the torque commands via a user interface, such as a throttle, a pedal, the controller 266, or other control device.

Figure 2A:
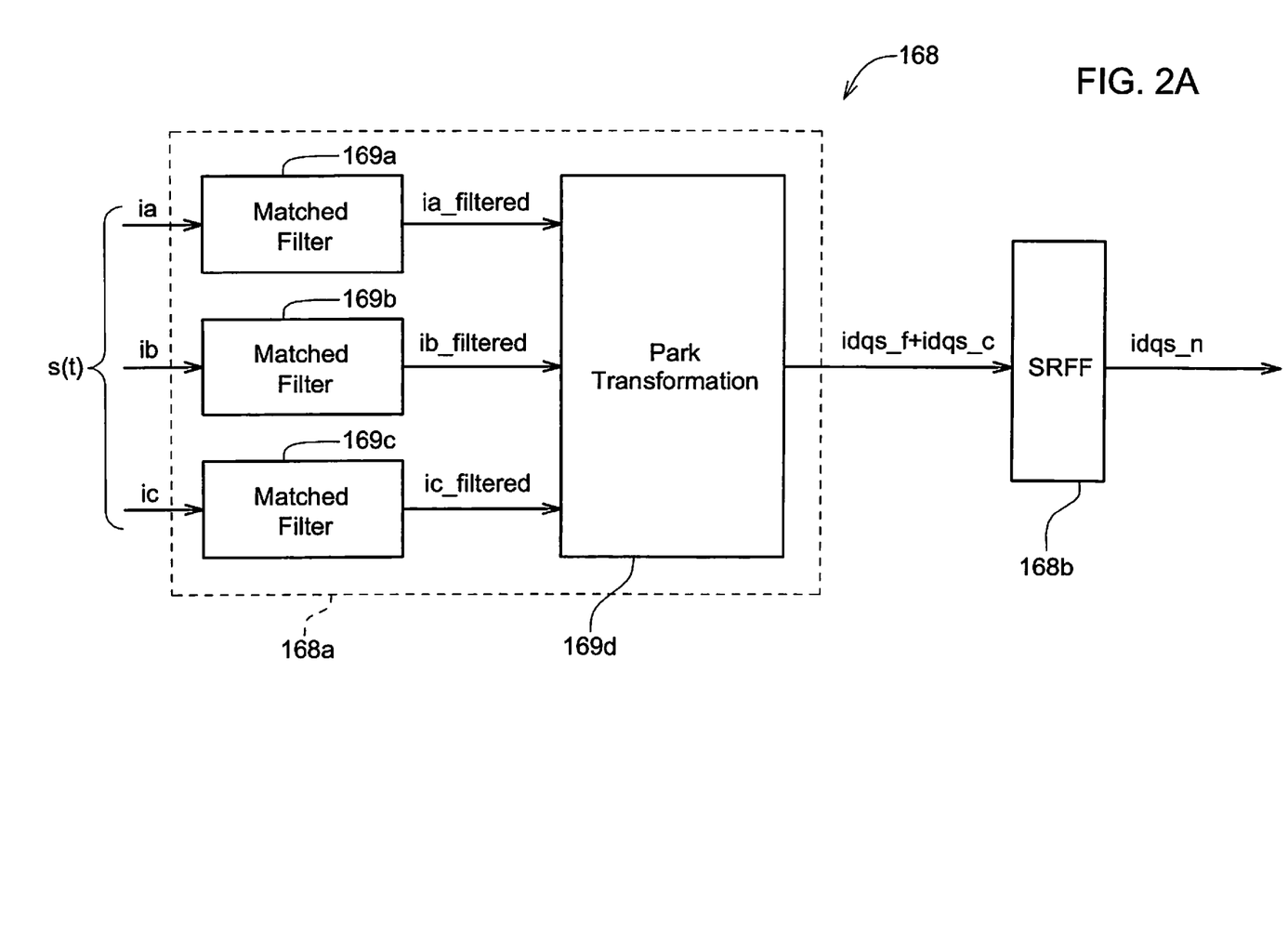
FIG. 2A illustrates an example embodiment of a matched filter and synchronous reference frame filter shown in FIG. 1A.

FIG. 2A illustrates an example embodiment of the matched filter and SRFF 168 shown in FIG. 1A. The matched filter and SRFF 168 includes a matched filter configured to filter noise from the measured current and a synchronous reference frame filter configured to extract the position information of the rotor from the filtered measured current.

As shown in FIG. 2A, the matched filter and SRFF 168 includes a matched filter 168a and an SRFF 168b. The matched filter 168A includes a plurality of matched filters 169a, 169b and 169c and a converter 169d.

The injected voltage is sinusoidal with a high carrier frequency. Due to factors in the machine, the injected voltage will decay along over time. Since the current sensors 180a, 180b and 180c may have a low resolution (0.6 A/bit) due to the wide sensing range, the signal-to-noise (SNR) ratio of the high frequency current response is very low. The low SNR ratio will affect the accuracy of the estimated initial position. To increase the estimation accuracy, the matched filter 168a is implemented to filter the current sensor noise and extract the decayed sinusoidal current response at the carrier frequency (500 Hz).

The matched filter 168a receives the measured three-phase representations of current ia, ib and ic. The matched filters 169a, 169b and 169c receive the measured three-phase representations of current ia, ib and ic, respectively, and produce filtered values ia_filtered, ib_filtered and ic_filtered.

The matched filter 168a is a linear time invariant (LTI) system designed to detect a waveform with a known shape. In an example embodiment, the matched filter 168a is designed to detect the known injected voltage waveform. During measurements of the current ia, ib and ic, the measurements are subjected to noise n(t). If the noise is white noise, the matched filter 168a that achieves a certain signal-to-noise ratio (SNR) is described as:

$$H(f) = kS^*(f) \quad (1)$$

where H is a Fourier Transformation (FT) of the filter system and S* is the conjugation of the FT of the s(t) signal with noise removed. The s(t) signal is the measured three-phase representations of current ia, ib and ic. A coefficient k is chosen such that the energy of signal does not change. Generally, k can be any real value other than zero. In an example embodiment, the k is chosen such that the energy of signal does not change. Consequently, if input signal s(t) is purely 500 Hz sinusoidal without any noise, the output signal is exactly s(t).

The matched filters 169a, 169b, 169c are in discrete time domain and are composed by several state holders in discrete time domain. For example, in a fifth order matched filter H(z), parameters a, b, c, d, and e are determined based on the waveform to be detected. More specifically, the parameters a, b, c, d and e construct the filter system, whose Fourier Transformation is H. The Fourier Transform H is determined by the controller 102 through Inverse Fourier Transformation. The parameters a, b, c, d, and e are determined by the controller 102 based on the Fourier Transform H.

The converter 169d performs a Park Transformation on the filtered values ia_filtered, ib_filtered and ic_filtered to generate current values $i_{dqs\_f} + i_{dqs\_c}$. The current values $i_{dqs\_f} + i_{dqs\_c}$ are input to the SRFF 168b.

The subscript s $i_{dqs\_f} + i_{dqs\_c}$ stands for stationary frame which means that the d-q axis is the same as α-β. The subscript c stands for carrier frequency which is the high frequency injected for initial position detection. The subscript f stands for the fundamental frequency at which is the motor 155 rotates.

The order and bandwidth of the matched filters 169a, 169b, 169c are not limited to fifth order. For example, the matched filters 169a, 169b, 169c may be tenth order matched filters.

Matched filters are further described in George L. Turin, *An Introduction to Matched Filters*, IRE Transactions on Information Theory, 1960, the entire contents of which are incorporated by reference.

As described, the matched filter 168a is configured to maintain a fundamental energy of a waveform of the measured current and maintain a sinusoidal shape of a waveform of the measured current.

Figure 2B:
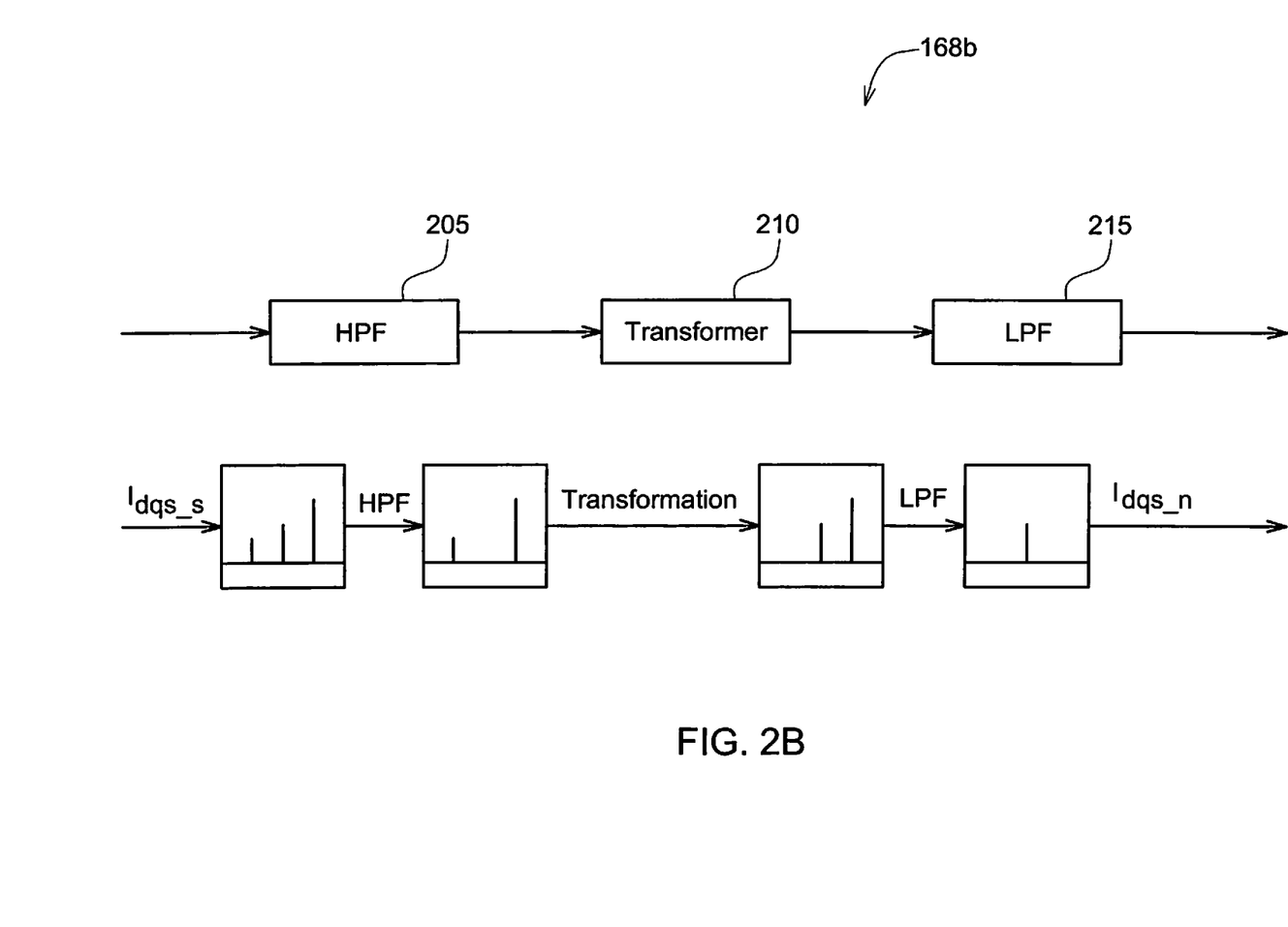
FIG. 2B illustrates an example embodiment of a synchronous reference frame filter according to an example embodiment.

FIG. 2B illustrates an example embodiment of the SRFF 168b and extraction of a negative sequence with the injected voltage. In FIG. 2B, $i_{dqs\_s}$ is $i_{dqs\_f}^s + i_{dqs\_c}^s$. As shown, the SRFF 168b includes a high pass filter 205, a transformer 210 and a low pass filter 215.

The high pass filter 205 receives the output of the converter 169d, $i_{dqs\_s}$. More specifically, $i_{dqs\_s}$ includes three components: a negative sequence, a zero frequency sequence and a positive sequence. The high pass filter 205 filters out the zero frequency sequence which represents a speed of the motor. The transformer 210 rotates the remaining two components. In other words, the transformer 210 shifts the negative sequence forward. The low pass filter 215 filters out the positive sequence and consequently, the negative sequence $i_{dqs\_n}$. The phase angle of the negative sequence $i_{dqs\_n}$ represents position information of the rotor in a stationary frame.

Referring back to FIG. 1A, the nonlinear high gain observer 170 receives the negative sequence $i_{dqs\_n}$. In an example embodiment, nonlinear high gain observer 170 determines an initial position of the motor during one capacitor discharging cycle.

The nonlinear high gain observer 170 implements the following using the negative sequence $i_{dqs\_n}$:

$$\varepsilon = K\sin(2(\theta_e - \hat{\theta}_e)) \quad (2)$$

$$\frac{d\hat{\omega}_e}{dt} = \hat{\omega}_e + \gamma_2 \varepsilon \quad (3)$$

$$\frac{d\hat{\theta}_e}{dt} = \hat{\omega}_e + \gamma_1 \varepsilon \quad (4)$$

where $\hat{\theta}_e$ is the estimated rotor position angle, $\theta_e$ is the measured rotor position angle, $\hat{\omega}_e$ is the estimated rotor electrical speed, $\gamma_2$ and $\gamma_1$ are gains that are adjusted during tuning of the nonlinear high gain observer 170, ϵ is a tracking error, $\hat{\theta}_e$ and $\hat{\omega}_e$ are the estimated position and speed from the nonlinear high gain observer 170 (observer outputs), 6 is the actual machine position which is embedded in a negative sequence current response. Gains $\gamma_2$ and $\gamma_1$ are determined by a Lyapunov (direct method) stability analysis which is known. The subscript e represents electrical properties.

It should be understood that the nonlinear high gain observer 170 may be implemented as hardware or software used with an associated processor to execute equations (2)-(4).

As described below, an initial rotor position is estimated by injection of a high frequency, rotating voltage vector excitation. The location of the magnetic axis can be estimated using the carrier signal current resulting from the interaction between the carrier signal voltage and the spatial saliency. The voltage injection may be:

$$v_{dqsc}^s = v_c e^{j\theta_c} = v_s(\cos\omega_c t + j\sin\omega_c t) \quad (5)$$

In example embodiments, a d-axis inductance $L_d$ is different than a q-axis inductance $L_q$. With this high frequency injection, a resistive drop can be neglected and the carrier frequency current produced by the interaction between the injected rotating carrier frequency voltage vector and the saliencies (i.e., $L_d \neq L_q$) is shown below:

$$i_{dqsc}^s \approx I_{c1p} e^{j(\omega_c t - \pi/2)} + I_{c1n} e^{j(-\omega_c t + 2\theta_r + \phi_{1n})} + I_{c2p} e^{j(2\omega_c t - \theta_r + 2\phi_{2p})} + I_{c2n} e^{j(-3\omega_c t + 3\theta_r + \phi_{2n})} \quad (6)$$

wherein, $i_{dqsc}^s$ is a high frequency current response due to the high frequency voltage injection, $I_{c1p} e^{j(\omega_c t + \pi/2)}$ is a positive sequence high frequency current ($1^{st}$ harmonic), $w_C$ is the carrier frequency (same frequency as the injected high frequency voltage), $I_{c1n} e^{j(-\omega_c t + 2\theta_r + \phi_{1n})}$ is the negative sequence high frequency current ($1^{st}$ harmonic), $\theta_r$ is rotor position, $I_{c2p} e^{j(2\omega_c t + 2\theta_r + 2\phi_{2p})}$ is a positive sequence high frequency current ($2^{nd}$ harmonic), Φ is a phase shift where subscript p represents positive and n represents negative.

Figure 3:
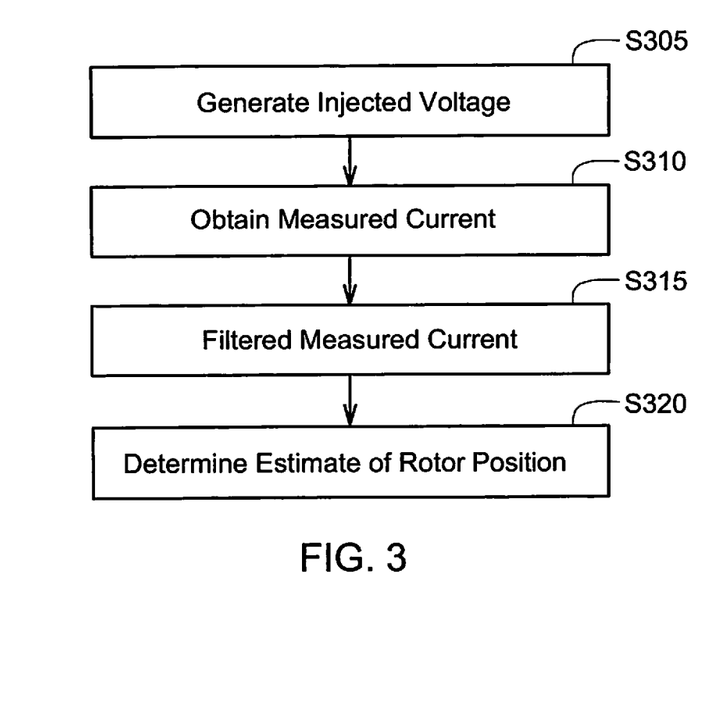
FIG. 3 illustrates a method of estimating a rotor position in a motor according to an example embodiment.

FIG. 3 illustrates a method of estimating a rotor position in a motor according to an example embodiment. The method includes generating a voltage for the motor at a stationary reference frame, obtaining a measured current for the motor, the measured current being based on the generated voltage, filtering the measured current to obtain position information of the rotor and determining an estimate of the rotor position during the stationary reference frame based on the position information.

The method of FIG. 3 may be in implemented in a sensorless drive system such as the drive system 100, shown in FIG. 1A. In the method of FIG. 3, a DC bus capacitor (e.g., capacitor 187) builds up a DC voltage from a low power supply such as a 48V portable battery (e.g., low power supply 190). The low power supply may be provided for a controller. The energy used for detection by the controller is the DC voltage built by the DC bus capacitor. Once a high frequency voltage is injected the DC voltage built up by the DC bus capacitor dissipates.

At S305, the drive system generates an injected voltage and applies the injected voltage. For example, with reference to FIG. 1A, the high voltage generator/injector 172 injects a high frequency voltage vector $v_{dq\_inj}$ rotating at a carrier frequency $w_C$ (e.g., 500 Hz) into a stationary reference frame of the IPMSM. This causes a voltage across the direct current (DC) bus capacitor to dissipate.

Referring back to FIG. 3, the drive system obtains a measured current at S310. For example, the current transducers 180a, 180b and 180c measure three phase current data ia, ib and ic, respectively, applied to the motor 155.

The converter 160 may apply a Clarke transformation or other conversion equations (e.g., certain conversion equations that are suitable and are known to those of ordinary skill in the art) to convert the measured three-phase representations of current into two-phase representations of current $i_{dqs\_f}^s + i_{dqs\_c}^s$ based on the current data ia, ib and is from the current transducers 180a, 180b and 180c.

At S315, the system filters the measured current. For example, the matched filter and SRFF 168 receives the measured two-phase representations of current $i_{dqs\_f}^s + i_{dqs\_c}^s$. Based on the measured two-phase representations of current $i_{dqs\_f}^s + i_{dqs\_c}^s$, the matched filter and SRFF 168 is configured to output a negative sequence signal $i_{dqs\_n}$ of the measured two-phase representations of current $i_{dqs\_f}^s + i_{dqs\_c}^s$. The negative sequence signal $i_{dqs\_n}$ represents position information of the rotor. Consequently, the filtering noise maintains a fundamental energy of a waveform of the measured current and a sinusoidal shape of a waveform of the measured current.

At S320, the system estimates a rotor position based on the filtered measured current. For example, the nonlinear high gain observer 170 receives the negative sequence signal $i_{dqs\_n}$ and outputs the estimated rotor position $\theta_e$ to the speed calculator 175 and the converter 160. The determination may occur during one discharging cycle of the DC bus capacitor.

Figure 4:
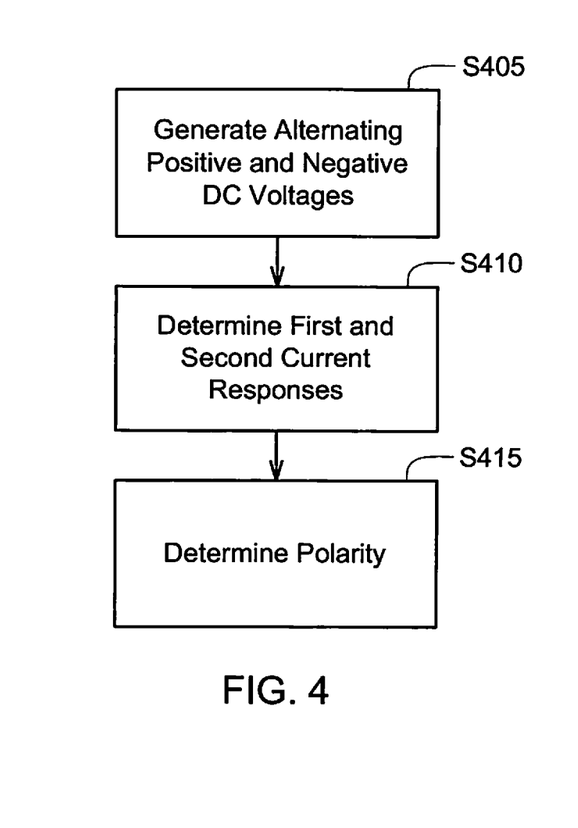
FIG. 4 illustrates a method of determining a polarity in a magnet of a permanent magnet synchronous machine (PMSM) according to an example embodiment.

FIG. 4 illustrates a method of determining a polarity in a magnet of a permanent magnet synchronous machine (PMSM) according to an example embodiment. The method includes generating alternating positive and negative DC voltages for a first period of time for the PMSM, determining first and second current responses of the PMSM based on the generated positive and negative DC voltages, respectively, and determining the polarity of the magnet based on the first and second current responses.

The method of FIG. 4 may be in implemented in a sensorless drive system such as the drive system 100, shown in FIG. 1. The method of FIG. 4 may be performed at the same time as the method of FIG. 3 or at different times.

At S405, the system injects two alternating positive and negative DC voltages (e.g., 15 V) having opposed spatial directions $\pm e^{jq}$ for a short amount of time (10 to 15 switching periods) separately on the estimated d-axis. For example, the injector 172 may supply the injected voltage. Consequently, voltage pulses with multiple switching periods are injected, as opposed to a single switching period. The voltage injected for polarity detection is a constant voltage injected on the estimated d-axis of the machine.

At S410, the system determines first and second current responses based on the injected voltages. More specifically, one Volt-sec aligns with the direction of the magnet flux, thus increasing the magnetization of the stator iron and driving the direct axis inductance into deeper saturation. Another Volt-sec opposes the direction of the magnet flux. This tends to de-saturate the stator iron and lets the d-axis inductance increase. The Volt-sec values of the injected voltage being identical, the amplitudes of the current responses differ as the respective inductance values differ.

At S415, the system determines the polarity of the rotor based on the first and second current responses. More specifically, the current response having the higher amplitude indicates the positive direction of the rotor axis.

As described above, the inventors have discovered a system configured to detect an IPMSM initial position without a high power supply.

At least one example embodiment discloses an extended back EMF-based adaptive QSMO for rotor position estimation for a sensorless IPMSM drive. The inventors have discovered that a discrete-time sliding mode observer (DSMO) with conventional switching functions, e.g., a sign function, will keep tight regulation to force the state trajectory close to the sliding surface even when tracking error is within the width of the boundary layer. This could cause a chattering problem during steady state. To mitigate this chattering problem, and to reach a global stability as well as a bounded motion within a limited boundary layer, a switching function may be implemented. The switching function leads to a quasi-sliding mode motion of the DSMO at steady state. Since the magnitude of the extended back EMF of the IPMSM changes with both load and speed variations, the parameters allow better performance than conventional SMOs.

At least one example embodiment discloses a method of estimating a rotor position in a motor. The method includes generating a voltage for the motor at a stationary reference frame, obtaining a measured current for the motor, the measured current being based on the generated voltage, filtering the measured current to obtain position information of the rotor and determining an estimate of the rotor position during the stationary reference frame based on the position information.

At least one example embodiment discloses a method of determining a polarity in a magnet of a permanent magnet synchronous machine (PMSM). The method includes generating alternating positive and negative DC voltages for a first period of time for the PMSM, determining first and second current responses of the PMSM based on the generated positive and negative DC voltages, respectively and determining the polarity of the magnet based on the first and second current responses. that the same may be varied in many ways. Such variations are not to be regarded as a departure from the spirit and scope of example embodiments, and all such modifications as would be obvious to one skilled in the art are intended to be included within the scope of the claims.

What is claimed is:

1. A drive system comprising:
   a motor including a rotor, the motor configured to receive a measured current;
   a controller configured to generate a voltage for the motor at a stationary reference frame, the generated voltage having a frequency and the measured current being based on the voltage;
   a filter configured to obtain position information of the rotor based on the measured current; and
   a nonlinear observer configured to estimate a rotor position of the motor during the stationary reference frame based on the position information,
   the controller being further configured to control the motor based at least in part on the estimated rotor position.

2. The drive system of claim 1, wherein the nonlinear observer is configured to sample the measured current at a frequency of less than 10 kHz.

3. The drive system of claim 2, wherein the nonlinear observer is configured to sample the position information at approximately 5 kHz.

4. The drive system of claim 1, wherein the controller is configured to generate the voltage to have a frequency of 500 Hz.

5. The drive system of claim 1, wherein the generated voltage dissipates a voltage across a direct current (DC) bus capacitor.

6. The drive system of claim 5, wherein the nonlinear observer is configured to estimate the rotor position during one discharging cycle of the DC bus capacitor.

7. The drive system of claim 1, further comprising:
   an inverter configured to supply a three-phase current to the motor based on pulse width modulation (PWM).

8. The drive system of claim 7, wherein the nonlinear observer is configured to estimate the rotor position at a sampling frequency relatively greater than a PWM frequency.

9. The drive system of claim 1, wherein the filter includes,
   a matched filter configured to filter noise from the measured current; and
   a synchronous reference frame filter configured to extract the position information of the rotor from the filtered measured current.

10. The drive system of claim 9, wherein the matched filter is configured to maintain a fundamental energy of a waveform of the measured current.

11. The drive system of claim 9, wherein the matched filter is configured to maintain a sinusoidal shape of a waveform of the measured current.

12. A method of estimating a rotor position in a motor, the method comprising:
   generating a voltage for the motor at a stationary reference frame, the generated voltage having a frequency;
   obtaining a measured current for the motor, the measured current being based on the generated voltage;
   filtering the measured current to obtain position information of the rotor; and
   determining an estimate of the rotor position during the stationary reference frame based on the position information.

13. The method of claim 12, wherein the determining an estimate includes sampling the position information at a frequency of less than 10 kHz.

14. The method of claim 13, wherein the determining an estimate includes sampling the position information at approximately 5 kHz.

15. The method of claim 12, wherein the generating a voltage generates the voltage to have a frequency of 500 Hz.

16. The method of claim 12, wherein the generated voltage dissipates a voltage across a direct current (DC) bus capacitor.

17. The method of claim 16, wherein the determining an estimate of the rotor position estimates the rotor position during one discharging cycle of the DC bus capacitor.

18. The method of claim 12, wherein the filtering includes,
   filtering noise from the measured current; and
   extracting, by a synchronous reference frame filter, the position information of the rotor from the filtered measured current.

19. The method of claim 18, wherein the filtering noise maintains a fundamental energy of a waveform of the measured current.

20. The method of claim 18, wherein the filtering noise maintains a sinusoidal shape of a waveform of the measured current.

21. A method of determining a polarity in a magnet of a permanent magnet synchronous machine (PMSM), the method comprising:
   generating alternating positive and negative DC voltages for a plurality of switching periods for the PMSM;
   determining first and second current responses of the PMSM based on the generated positive and negative DC voltages, respectively; and
   determining the polarity of the magnet based on the first and second current responses.

22. The method of 21, wherein the polarity is based on a highest current response of the first and second current responses.

* * * * *